April 12, 1927.  E. C. HATCHER  1,624,835

VARIABLE SPEED MECHANISM

Filed March 19, 1926   3 Sheets-Sheet 1

April 12, 1927.  
E. C. HATCHER  
1,624,835  
VARIABLE SPEED MECHANISM  
Filed March 19, 1926  
3 Sheets-Sheet 3
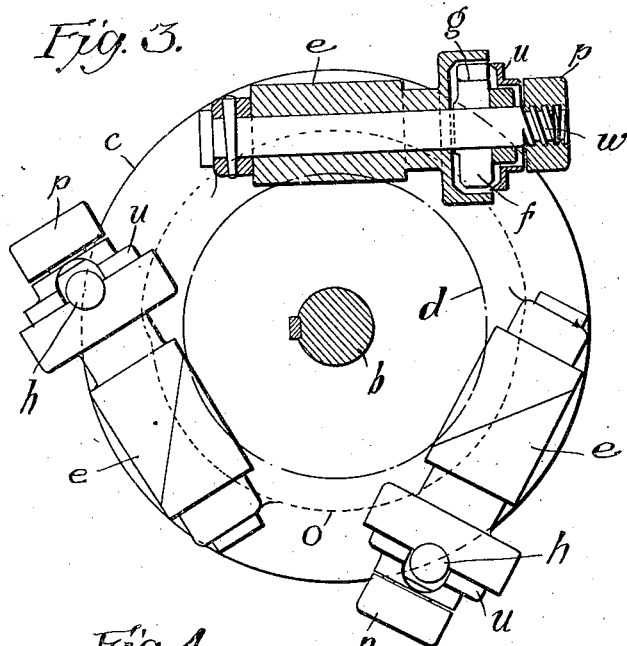
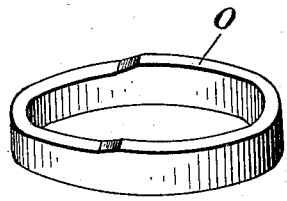
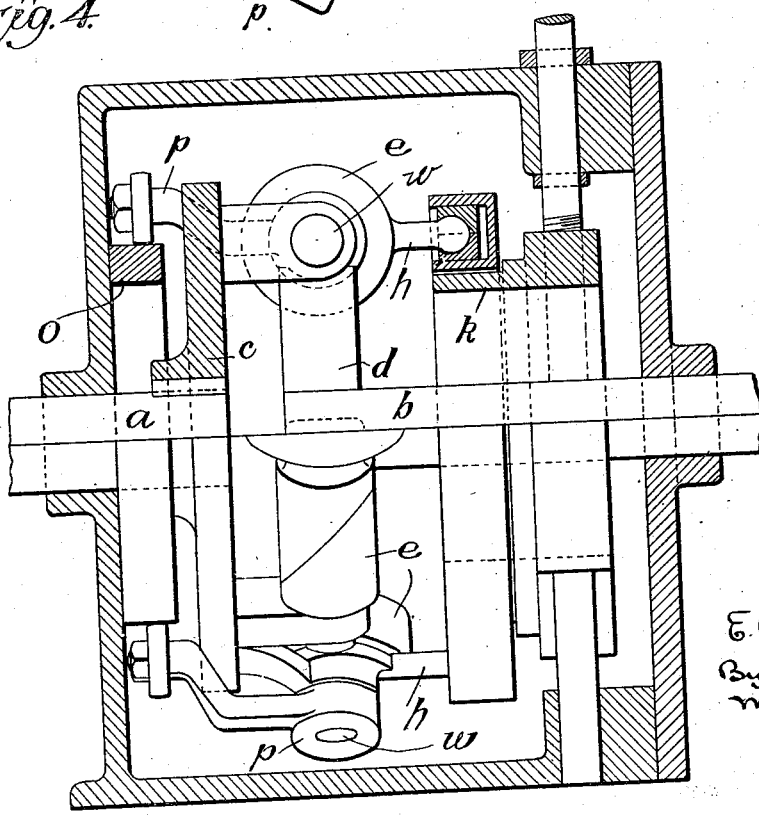

Patented Apr. 12, 1927.

1,624,835

UNITED STATES PATENT OFFICE.

ERNEST CHARLES HATCHER, OF FINCHLEY, LONDON, ENGLAND.

VARIABLE-SPEED MECHANISM.

Application filed March 19, 1926, Serial No. 96,023, and in Great Britain March 16, 1925.

This invention relates to variable speed mechanisms of the type known as infinitely variable, that is to say mechanisms in which, between limits, the speed ratio can be varied by infinitesimal gradations. The invention relates particularly to mechanisms of the type in which variable rotary motion is obtained by the action of an oscillator of variable amplitude operating through a unidirectional clutch and co-operating with a cam like member of variable eccentricity.

The object of the invention is to enable a mechanism as aforesaid to be used in a speed reduction mechanism. It has been proposed previously to employ an oscillator in unidirectional clutch connection with the planet pinion of an epicyclic mechanism, the oscillator being controlled by a cam of variable eccentricity. Such a mechanism can only be used for actuating a driven shaft at the same speed as the driving shaft or at a higher speed.

The present invention comprises the combination with the rollers, pawls or other intermediate connecting devices of a unidirectional clutch, of means for engaging said devices and holding them out of action during alternate phases of motion.

Referring to the three accompanying sheets of explanatory drawings:—

Figures 3 and 4 are part sectional diagrammatic end and side views, respectively, of a modification of the invention.

Figure 5 is a detail perspective of the cam removed.

Figure 1:
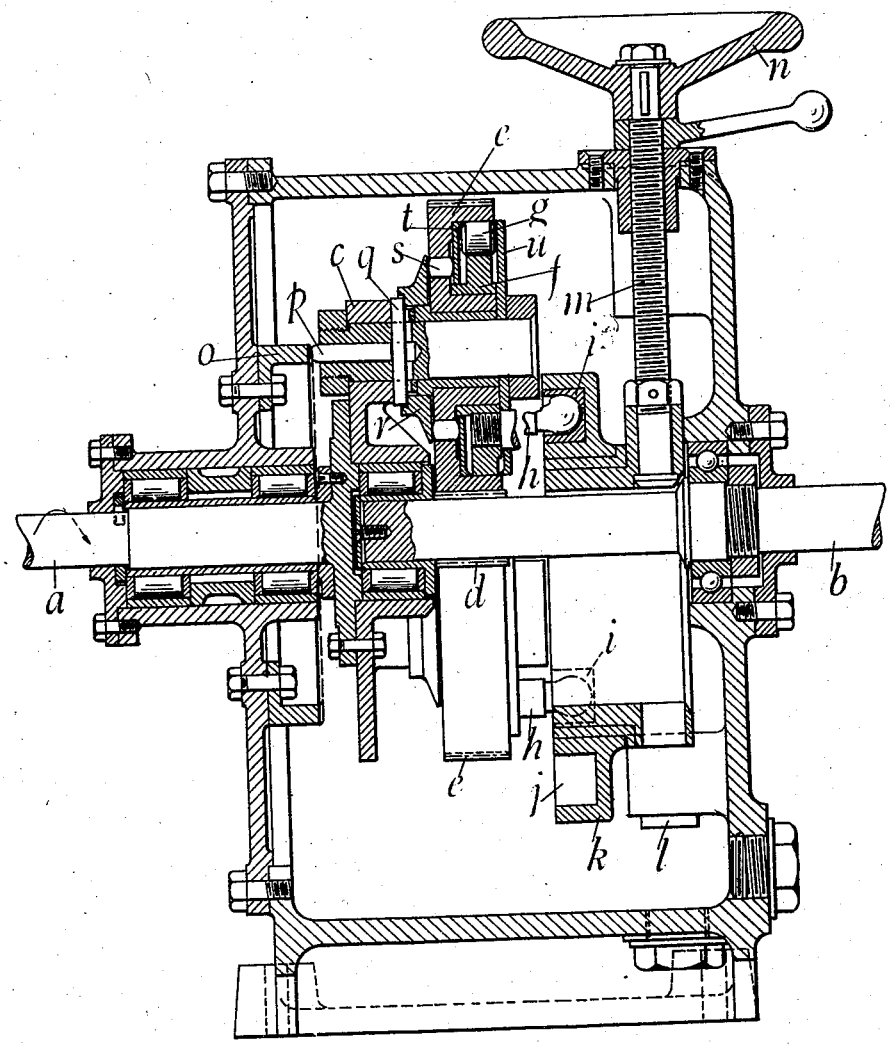
Figure 1 is a longitudinal section, and Figure 2 a transverse section of a variable speed mechanism constructed in accordance with this invention.
Figure 2:
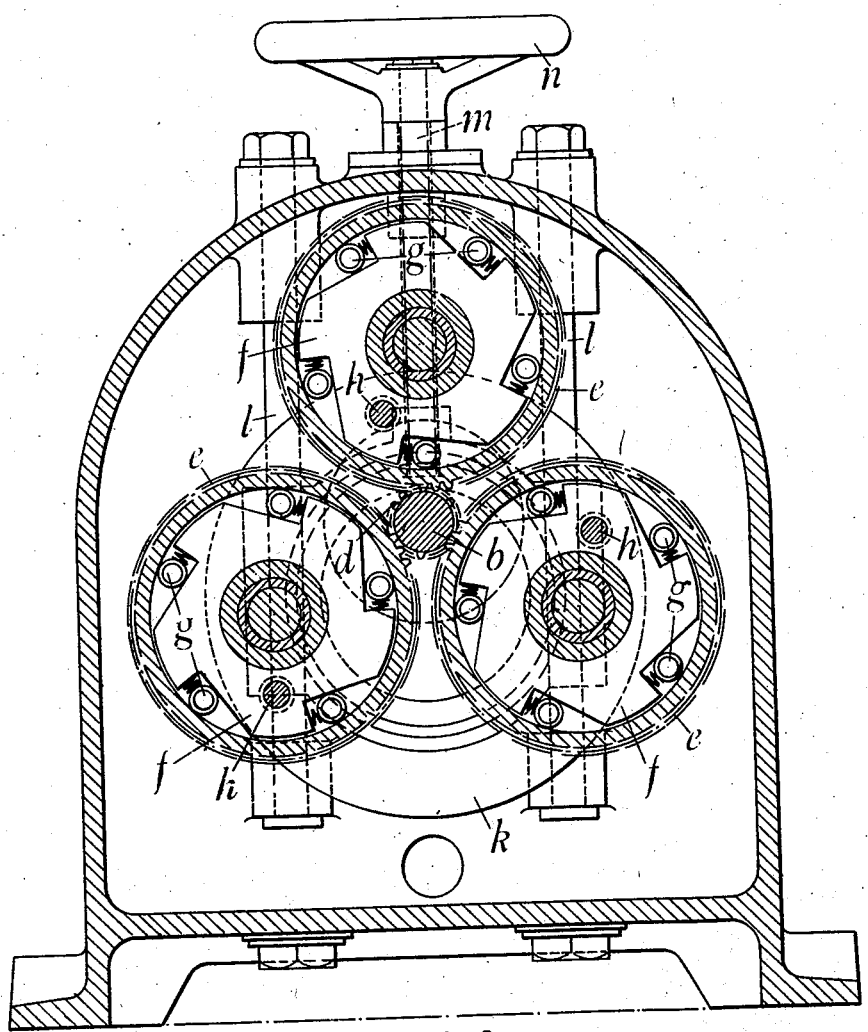

Referring to Figures 1 and 2, a pair of shafts $a$, $b$, (driver and driven) are mounted coaxially. On one ($a$) is secured a planet carrier $c$, and on the other ($b$) a sun pinion $d$. The planet carrier has freely mounted on it at suitable distances apart a plurality of planet wheels $e$. Coaxially with each planet wheel is arranged an oscillator $f$ in the form of one element of a free-wheel clutch. Rollers $g$ in inclined cavities in the outer periphery of each oscillator serve to effect unidirectional driving connection with the inner periphery of the wheel. From one side of the oscillator (and at distance from its centre) extends a projection $h$ (preferably carrying a roller $i$) which co-operates with a circular groove $j$ in one face of a non-rotatable ring $k$ which can be moved transversely to the axis of the shafts for the purpose of varying the eccentricity of the ring, that is to say the axis of the ring in relation to the axis of shafts. The ring can slide on a pair of parallel guides $l$, and is movable thereon by a screw $m$ operated by a hand wheel $n$.

When the ring is concentric no relative motion can occur between the sun and planet pinions, and the mechanism rotates as one piece. By sliding the ring to a new position and thereby imparting to it eccentricity, rotation of the carrier relatively to the ring is accompanied by movement of each oscillator relatively to its wheel, each oscillator performing one oscillation in each rotation of the carrier. During the motion of an oscillator in one direction an extra movement is given to the planet wheel which is transmitted to the sun pinion, thereby causing the latter to be driven at a higher speed, the driving shaft $a$ being rotated in the direction of the arrow (Figure 1). The actions of the different oscillators are suitably correlated so that each contributes to the increase of speed of the driven shaft. The amount of increase depends (in a given mechanism) on the eccentricity of the aforesaid ring, the upper limit being determined by the design of the mechanism.

As already stated, the object of the present invention is to enable a mechanism of the kind above described to rotate the driven shaft at a lower speed than that of the driver. To enable this result to be accomplished in accordance with my invention I employ means for holding the rollers $g$ out of action during alternate phases of motion. As shown in Figure 1, for example, such means comprise a fixed cam ring $o$ shown in detail in Figure 5 (the operative surface of which is shown in Figure 1 by dotted lines and the inoperative surface by full lines), and in conjunction with each planet is arranged a push rod $p$, cross pin $q$, thrust plate $r$, push pieces $s$, a movable plate $t$ and a fixed plate $u$. The plates $t$ and $u$ are formed with overhanging chamfered peripheral lips adapted to engage the chamfered ends of the rollers $g$. When by the interaction of the ring $o$ and push rod $p$, the plate $t$ is pressed towards the rollers the chamfered lips press the rollers backwards slightly relatively to the part $f$ and hold them clear of the inner periphery of the wheel $e$ and so prevent the rollers from acting. After the part *p* has passed the high part of the cam ring *o* the rollers are released. With this arrangement an opposite effect to that first described is obtained and the shaft *b* is driven at a lower rate than the shaft *a*.

Instead of plain toothed pinions, worm gearing may be employed. For example, in the mechanism first described the sun pinion may be replaced by a worm wheel, and the planet pinions by worms.

One application of the invention to a mechanism in which worm gearing is employed is shown in Figures 3 and 4. The carrier *c* on the driving shaft *a* has mounted on it a plurality of planet worms *e* engaging with a sun worm wheel *d* on the driven shaft *b*. At one end of each worm are arranged the inner element *f* of a unidirectional clutch, and intermediate rollers *g*. A lever like extension *h* from the element *f* engages an adjustable eccentric *k*. The rollers *g* can be put out of action by the plate *u* which can be moved axially by a lever *p* cooperating with a cam *o*. The lever *p* engages a screw threaded portion of the spindle *w* carrying the worm.

The invention is not limited to the particular form of unidirectional clutch described; for example, pawls may be used instead of rollers. Also any convenient means acting on the rollers, pawls or the like may be employed for alternately preventing and permitting transmission of motion from one part of the clutch to the other.

Having thus described my invention what I claim as new and desire to secure by Letters Patent is:—

1. In a variable speed mechanism, drive and driven members, a carrier on one of said members, a unidirectional clutch including driving and driven parts carried by the carrier and intermediate elements connecting the driving and driven parts, a driving connection between the driven part and the other member, means for oscillating the driving part, and means for retaining said elements in inactive position during certain periods.

2. In a variable speed mechanism, drive and driven members, a carrier on one of said members, a unidirectional clutch including driving and driven parts carried by the carrier and intermediate connecting elements connecting the driving and driven parts, a driving connection between the driven part and the other member, means for oscillating the driving part, and cam means for retaining said intermediate elements in inactive position during certain periods.

3. In a variable speed mechanism, drive and driven members, a carrier on one of said members, a unidirectional clutch including driving and driven parts carried by the carrier and intermediate connecting elements, connecting the driving and driven parts, a driving connection between the driven part and the other member, means for oscillating the driving part, a movable plate for displacing the intermediate elements to inactive position, and means for controlling said plate.

4. In a variable speed mechanism, drive and driven members, a carrier on one of said members, a unidirectional clutch including driving and driven parts carried by the carrier and intermediate connecting elements connecting the driving and driven parts, a driving connection between the driven part and the other member, means for oscillating the driving part, a movable plate for displacing the intermediate elements to inactive position, and means constituted in part by a cam for controlling said plate.

In testimony whereof I have signed my name to this specification.

E. C. HATCHER.